(12) United States Patent
Branken et al.

(10) Patent No.: US 10,788,374 B2
(45) Date of Patent: Sep. 29, 2020

(54) TEMPERATURE SENSING ASSEMBLY FOR MEASURING TEMPERATURE OF A WALL OF A HIGH TEMPERATURE VESSEL

(71) Applicants: Jesse Branken, Houston, TX (US); Samuel Stein, Houston, TX (US); Jeffrey N. Daily, Houston, TX (US); Carlos Alvarado, Houston, TX (US); Raymond B. Litteaur, Houston, TX (US)

(72) Inventors: Jesse Branken, Houston, TX (US); Samuel Stein, Houston, TX (US); Jeffrey N. Daily, Houston, TX (US); Carlos Alvarado, Houston, TX (US); Raymond B. Litteaur, Houston, TX (US)

(73) Assignee: Daily Instruments, Houston, TX (US)

( * ) Notice: Subject to any disclaimer, the term of this patent is extended or adjusted under 35 U.S.C. 154(b) by 0 days.

(21) Appl. No.: 16/206,547

(22) Filed: Nov. 30, 2018

(65) Prior Publication Data

US 2019/0107444 A1 Apr. 11, 2019

Related U.S. Application Data

(63) Continuation of application No. 14/994,962, filed on Jan. 13, 2016, now Pat. No. 10,175,117.

(51) Int. Cl.
*G01K 1/02* (2006.01)
*G01K 1/14* (2006.01)
*G01K 7/04* (2006.01)

(52) U.S. Cl.
CPC ............... *G01K 1/026* (2013.01); *G01K 1/14* (2013.01); *G01K 7/04* (2013.01)

(58) Field of Classification Search
CPC ............. G01K 1/026; G01K 1/14; G01K 7/04
USPC ......... 374/208, 54, 110, 148, 163, 166, 179, 374/198, 199
See application file for complete search history.

(56) References Cited

U.S. PATENT DOCUMENTS

| 2003/0016730 | A1* | 1/2003 | Daily | G01K 1/026 374/179 |
| 2008/0008227 | A1* | 1/2008 | Jang | G01K 1/14 374/208 |
| 2012/0305446 | A1* | 12/2012 | Daily | B01J 8/0285 208/46 |
| 2013/0070808 | A1* | 3/2013 | Daily | G01K 1/026 374/179 |

\* cited by examiner

*Primary Examiner* — Jonathan M Dunlap
*Assistant Examiner* — Janice M Soto
(74) *Attorney, Agent, or Firm* — Duane Morris LLP; Diana M. Sangalli

(57) ABSTRACT

A temperature sensing assembly for measuring the temperature of an inner wall of a high temperature vessel includes a thermocouple assembly having multiple junction points to provide indications of temperature. The assembly further includes support structures for supporting the thermocouple assembly in the interior space of the vessel and to maintain the junction points proximate the inner wall of the vessel.

15 Claims, 9 Drawing Sheets

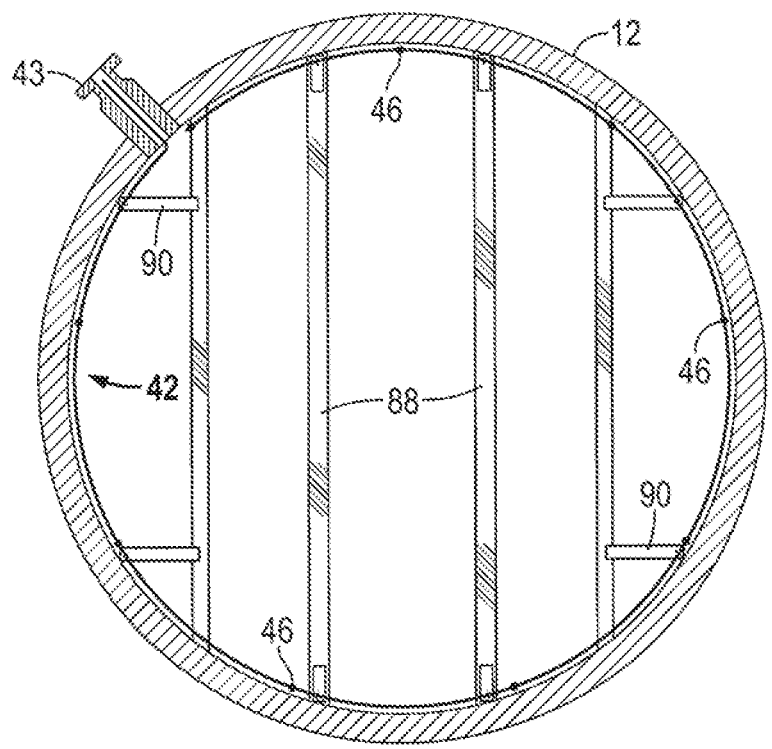
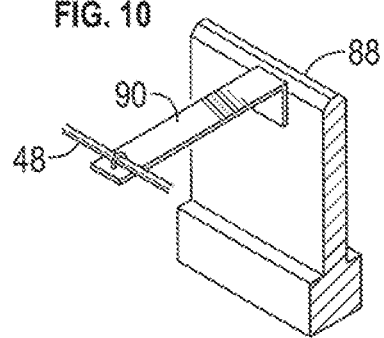
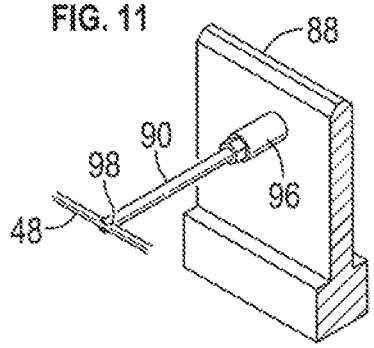

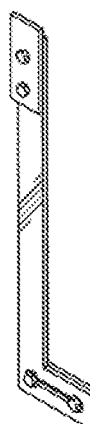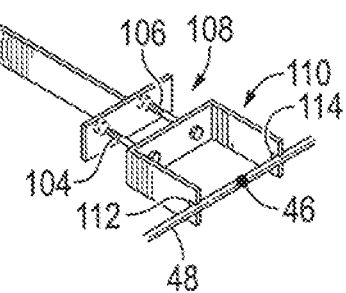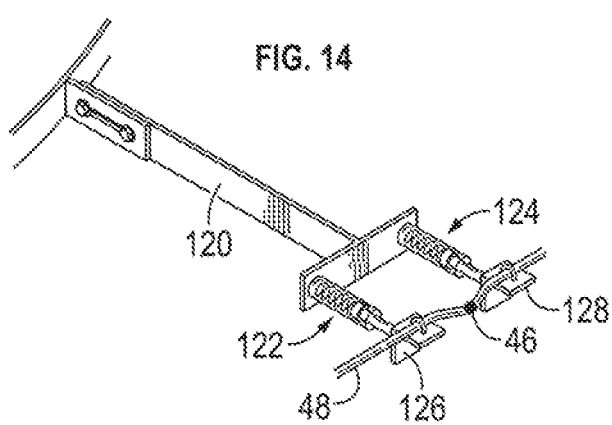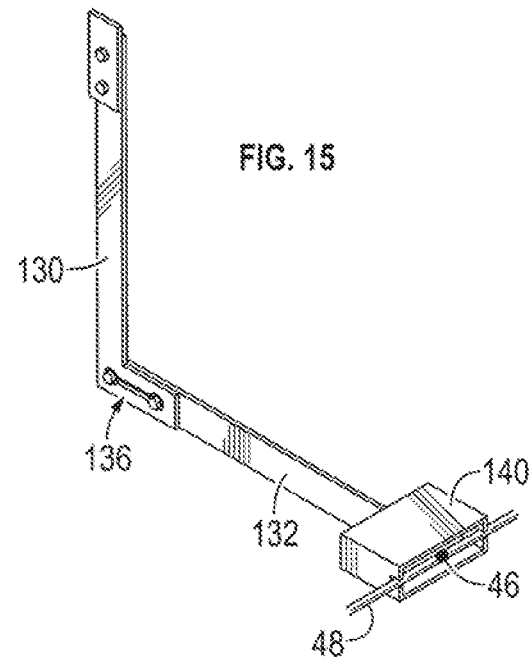

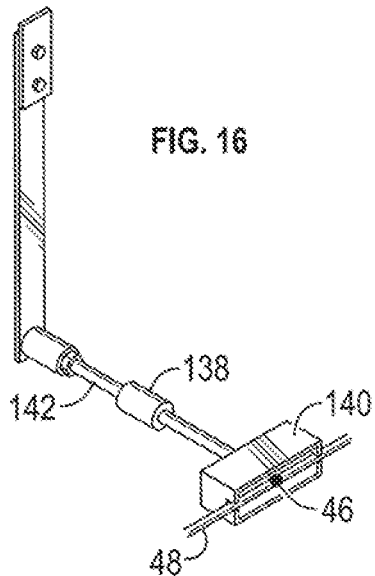
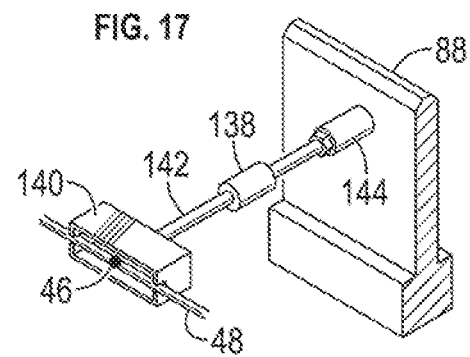
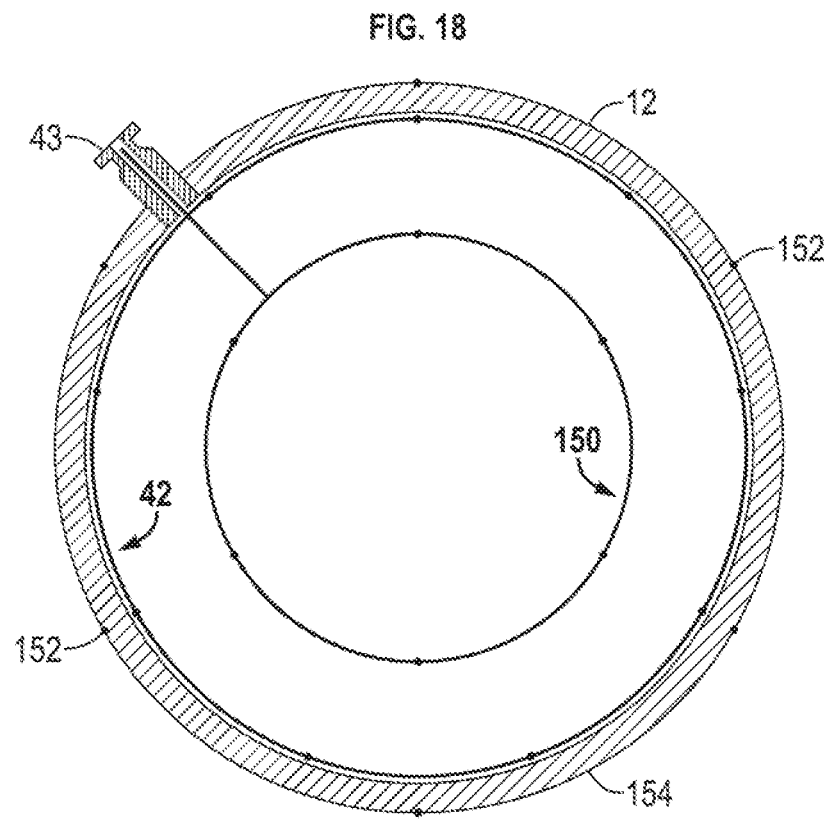

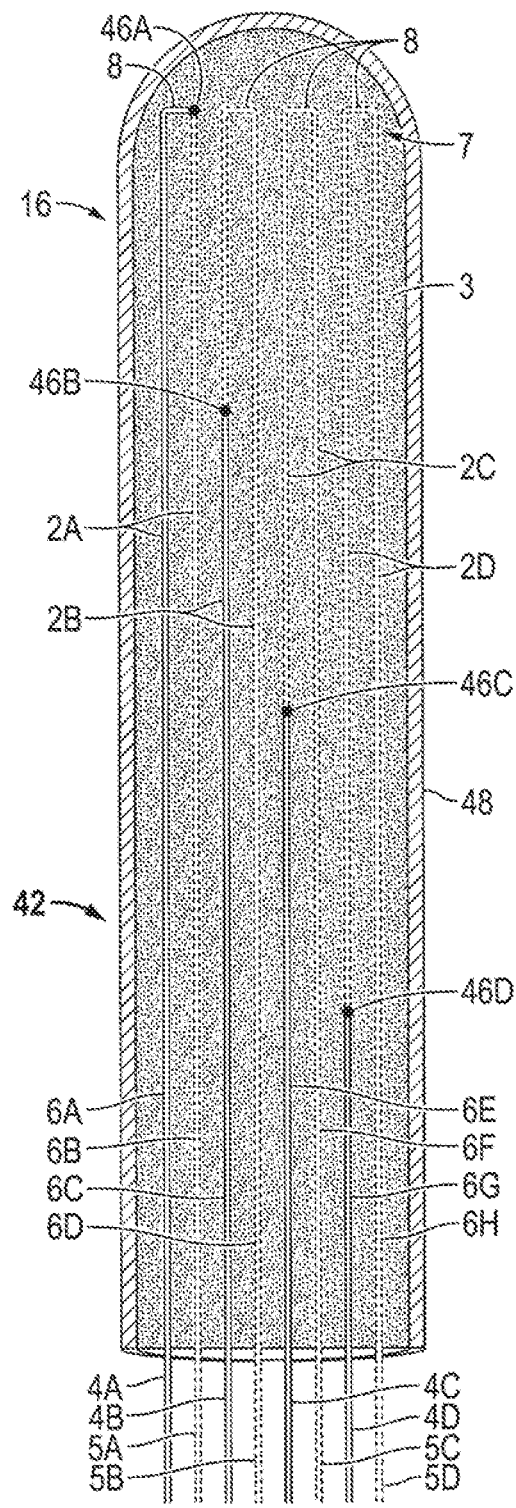
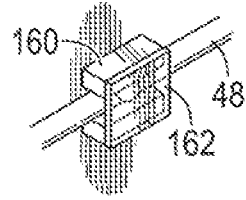

TEMPERATURE SENSING ASSEMBLY FOR MEASURING TEMPERATURE OF A WALL OF A HIGH TEMPERATURE VESSEL

CROSS-REFERENCE TO RELATED APPLICATION

This application is a continuation of U.S. patent application Ser. No. 14/994,962, filed Jan. 13, 2016, herein fully incorporated by reference.

TECHNICAL FIELD

The present invention relates generally to monitoring temperature, and, more particularly, to monitoring temperature of the inner wall of a high temperature vessel, such as a reactor vessel used in the petrochemical and refining industry.

BACKGROUND

The petrochemical and refining industries generally employ various processes where temperature must be measured reliably and accurately. Many of these processes involve treatment of a hydrocarbon material using various catalytic processes that are carried out in a reactor vessel. Typically, such processes involve reacting the hydrocarbon material with hydrogen in a series of catalyst beds, each of which is made up of a material that is suited for the type of hydroprocess performed in the particular bed. These processes are performed at high temperatures, which must be monitored and controlled to ensure that the process is carried out efficiently, but safely without damaging either the vessel or the materials that make up the catalyst beds.

A variety of temperature sensors have been used in conjunction with these processes. For example, temperature sensors can be deployed in a catalyst bed to monitor the temperature of the catalyst for the purpose of maintaining control of the temperature of the process, maximizing the use of the catalyst and/or projecting the remaining useful life of the catalyst. Other temperature sensors can be used to monitor the outer surface (or skin) of a high temperature vessel or tubes or other conduits that are present within a furnace used a refining process to ensure both that the structure is not overheating and that the process is occurring at a desired temperature. However, neither of these types of arrangements of sensors can provide accurate measurements of the temperature of the inner wall of a high temperature vessel. For instance, while a temperature sensor embedded in the catalyst bed can provide information about the temperature of the process occurring in the bed, it can provide only an approximation of the temperature of the inner wall of the vessel. Similarly, sensors that monitor temperature of the outside wall of the vessel can provide only an approximation of the temperature of the inner wall.

Knowledge of the actual and real-time temperature of the inner wall of a high temperature vessel can lead to more well-informed decisions by an operator of a high temperature vessel. As an example, if the operator is confident that the temperature sensing assembly is providing an indication of the actual temperature of the inner wall (as opposed to an approximation), then the process being performed in the vessel can be implemented at as high of a temperature as possible to obtain maximum yield without concern that the structure of the vessel itself may be overheating. Further, real time measurements of the actual temperature allow the operator to more quickly take remedial actions in the event of a hazardous situation. As an example, during some hydrocarbon processes, petroleum coke accumulations (or coke-ball build ups) may occur within the reactor. Although the coke accumulations can be benign, they also can cause failures if they are near or move towards the reactor wall. Accurate and real-time information about the temperature of the reactor wall (and thus the integrity of the reactor) can allow the operator to attempt to lower the temperature of the process by applying a quenching fluid or to take other actions to safeguard the environment and the workers.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows:

FIG. 9 is a cross section of a vessel that includes a temperature sensing assembly arranged to monitor temperature along a radial profile of the inner wall, depicting beams and support structures for supporting the temperature sensing assembly, according to an embodiment.

FIG. 10 is an exemplary support structure for supporting a temperature sensing assembly that can be implemented in the arrangement of FIG. 9, according to an embodiment.

FIG. 11 is another exemplary support structure for supporting a temperature sensing assembly that can be implemented in the arrangement of FIG. 9, according to an embodiment.

FIG. 12 is another exemplary support structure for supporting a temperature sensing assembly that can be implemented in the arrangement of FIG. 6, according to an embodiment.

FIG. 13 is another exemplary support structure for supporting a temperature sensing assembly that can be implemented in the arrangement of FIG. 9, according to an embodiment.

FIG. 14 is another exemplary support structure for supporting a temperature sensing assembly, according to an embodiment.

FIG. 15 is another exemplary support structure and heat shield for supporting a temperature sensing assembly that can be implemented in the arrangement of FIG. 6, according to an embodiment.

FIG. 16 is another exemplary support structure and heat shield for supporting a temperature sensing assembly that can be implemented in the arrangement of FIG. 6, according to an embodiment.

FIG. 17 is another exemplary support structure and heat shield for supporting a temperature sensing device that can be implemented in the arrangement of FIG. 9, according to an embodiment.

FIG. 18 is a cross section of a vessel that includes a temperature sensing device arranged to monitor temperature along a radial profile of the inner wall, a temperature sensing device arranged to monitor temperature within an interior space of the vessel, and temperature sensing device to monitor temperature on the outer surface of the vessel, according to an embodiment.

FIG. 19 is a cross sectional view of a temperature sensing device that can be used to monitor temperature along the inner wall or within the interior space of a high temperature vessel, according to an embodiment.

FIG. 20 is another exemplary support structure for supporting a temperature sensing assembly, according to an embodiment.

DETAILED DESCRIPTION

Embodiments of the invention provide a temperature sensing assembly for sensing the temperature at multiple locations along or near a profile of the inside wall of a high temperature vessel. The temperature sensing assembly includes multiple sensing points. In some embodiments, the sensing points all are disposed within a single grounded or ungrounded sheath. Alternatively, the temperature sensing assembly can include multiple single point thermocouples arranged to sense temperature at corresponding multiple locations along the inside wall of the vessel. In any embodiment, the temperature sensing assembly is supported at multiple locations along the inside wall of the vessel in a manner that minimizes the distance between the wall and the sensing points. Supports that minimize the distance and stabilize the assembly can include clips, hangers, bosses, and tack welds, as examples. These supports can be used alone or in combination with adjustable or resilient members that position or exert a force that biases the assembly towards or against the wall. In embodiments in which another material, such as a catalyst, is present within the vessel, heat shields may be used to isolate the sensing points from the material or any other thermal sources other than the inner wall of the vessel. In this manner, the temperature sensed by the sensing points more closely reflects the temperature of the inner wall of the vessel.

In embodiments in which multiple sensing points are contained within a single sheath, the sheath of temperature assembly can be twisted (either during manufacture or at the time of installation) in order to position the sensing points so that they are aligned with, and thus adjacent to, the profile of the inner wall of the vessel. Because the temperature data obtained from such a temperature sensing assembly provides an accurate and real-time indication of the actual temperature at multiple points along the inner wall, the operator can allow the process occurring within the vessel to occur at a higher temperature for a higher yield. Likewise, the temperature data can improve the operator's ability to make well-informed decisions regarding a needed or appropriate response to a potential over-temperature condition that is occurring near the inner wall of the high temperature vessel.

Figure 1:
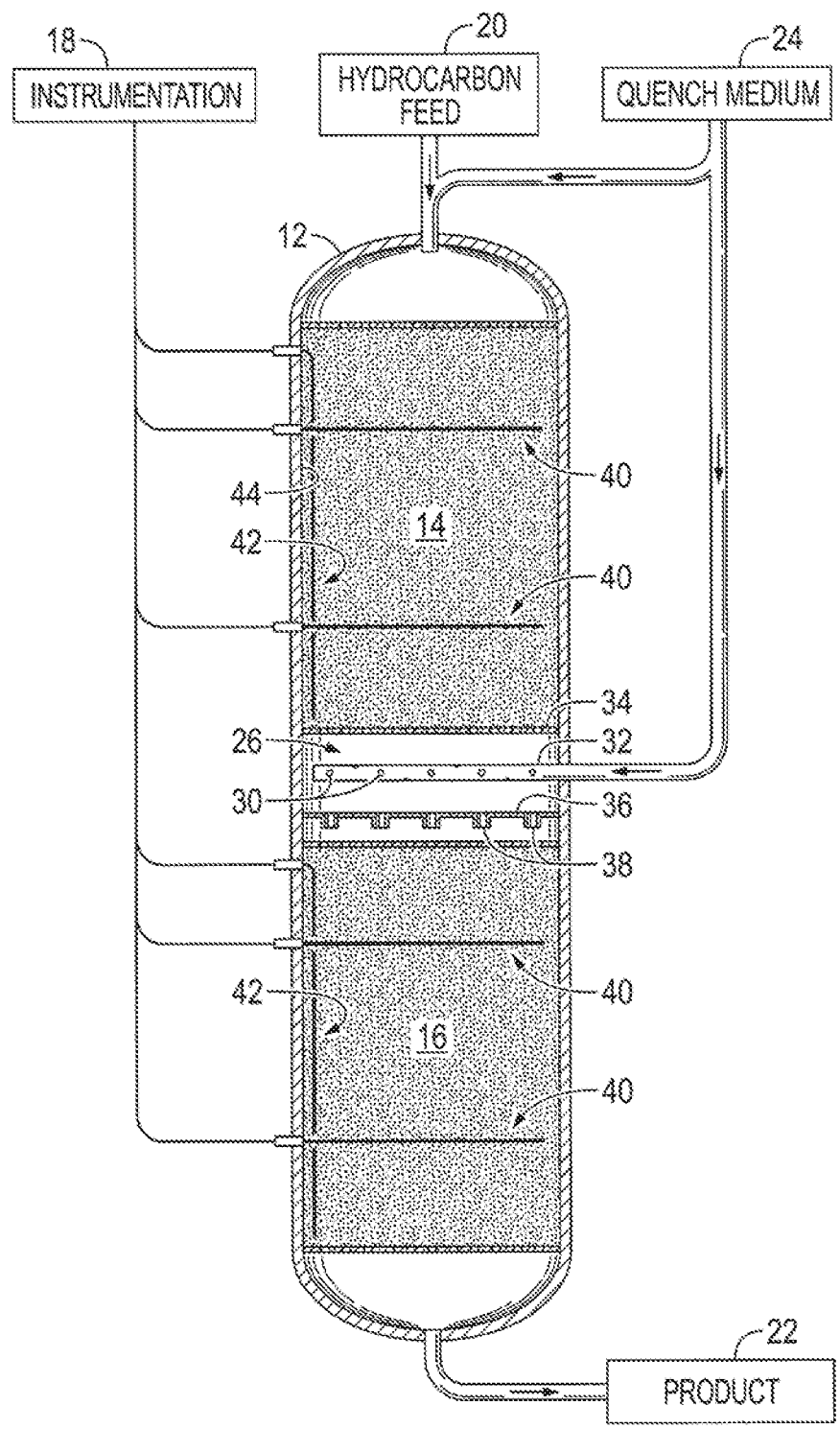
FIG. 1 is a schematic illustration of a temperature sensing system for sensing temperature in a high temperature vessel, according to an embodiment.

Referring generally now to FIG. 1, a schematic representation is provided of a system 10 in which exemplary embodiments can be implemented. It should be understood, however, that system 10 is an exemplary application for embodiments of the invention, and that other applications also are envisioned and within the scope of the invention. In the application of FIG. 1, system 10 includes a reactor vessel 12 containing a plurality of vertically spaced hydroprocessing catalyst beds 14 and 16. Although two catalyst beds are shown, it should be understood that the vessel 12 may contain less or more than two catalyst beds, as may be appropriate for the particular hydrocarbon material and the particular hydroprocess(es) or hydrotreatment(s) performed. In the embodiment shown, a feed stream of a hydrocarbon component 20 to be processed is introduced into the top of the vessel 12 so that the feed 20 can thereafter flow downwardly through the series of vertically spaced catalyst beds 14, 16 and exit the vessel 12 as product 22. A quench component or medium 24, such as hydrogen gas or liquid, also is introduced into the vessel 12, such as at the top of the vessel 12 along with the hydrocarbon component 20. The quench component 24 also may be introduced through delivery ports 30 of a quench pipe 32 at a quench zone 26, where a mixing device (not shown) mixes the quench component 24 with the hydrocarbon stream flowing into the zone 26 from the overlying catalyst bed. The quench component 24, which is at a lower temperature than the hydrocarbon stream, generally is used to adjust the temperature of the mixture in the quench zone 26 with the goal of ensuring that the process in the catalyst bed 16 occurs at a temperature that is suited for attaining a maximum yield while not damaging the catalyst material. If hydrogen gas or liquid is used as the quench component 24, quenching also serves to replenish any hydrogen lost by the hydrocarbon stream due to exothermic reactions in the quench zone 26.

In general, the quench zone 26 is defined by a support screen 34, which supports the overlying catalyst bed, and a distribution tray 36, which redistributes the feed mixture across the top of the underlying catalyst bed through delivery ports 38. One or more temperature sensing devices 40 (e.g., single or multipoint thermocouples) are disposed at various locations in the catalyst beds 14, 16 to observe temperature in the vessel 12 and to provide electrical signals representative of the observed temperature to measurement instrumentation 18 that is exterior of the vessel 12. For instance, the temperature sensing devices 40 can be multipoint thermocouple devices, each of which has multiple conductor pairs of dissimilar conductive materials joined at corresponding sensing points. In the embodiment shown, multipoint temperature sensing devices 40 are positioned within each catalyst bed 14, 16 to measure temperature within various regions of the beds 14, 16.

The embodiment of FIG. 1 also includes two temperature sensing devices 42 (e.g., single or multipoint thermocouples) that are arranged to sense the temperature of the inner wall 44 of the vessel 12. Although only two temperature sensing devices 42 are shown, it should be understood that one or more devices 42 can be deployed within a vessel 12 to provide a profile of the inner wall 44 temperature. As examples, the vessel 12 can include multiple multipoint devices 42, each of which provides a vertical profile of temperature at different levels within the vessel 12, as illustrated in FIG. 1. Alternatively or in addition, the vessel 12 can include one or more multipoint devices 42, each of which is arranged to provide a radial (or horizontal) temperature profile of the inner wall 44 of the vessel 12 at one or more levels within the vessel 12. Yet further, vessel 12 can include multiple single point thermocouple devices 42 arranged to provide a vertical and/or radial temperature profile of the inner wall of the vessel 12. Still further, a combination of single point and multipoint thermocouple devices 42 can be used to sense temperature at any desired locations along the inner wall of the vessel 12.

Figure 2:
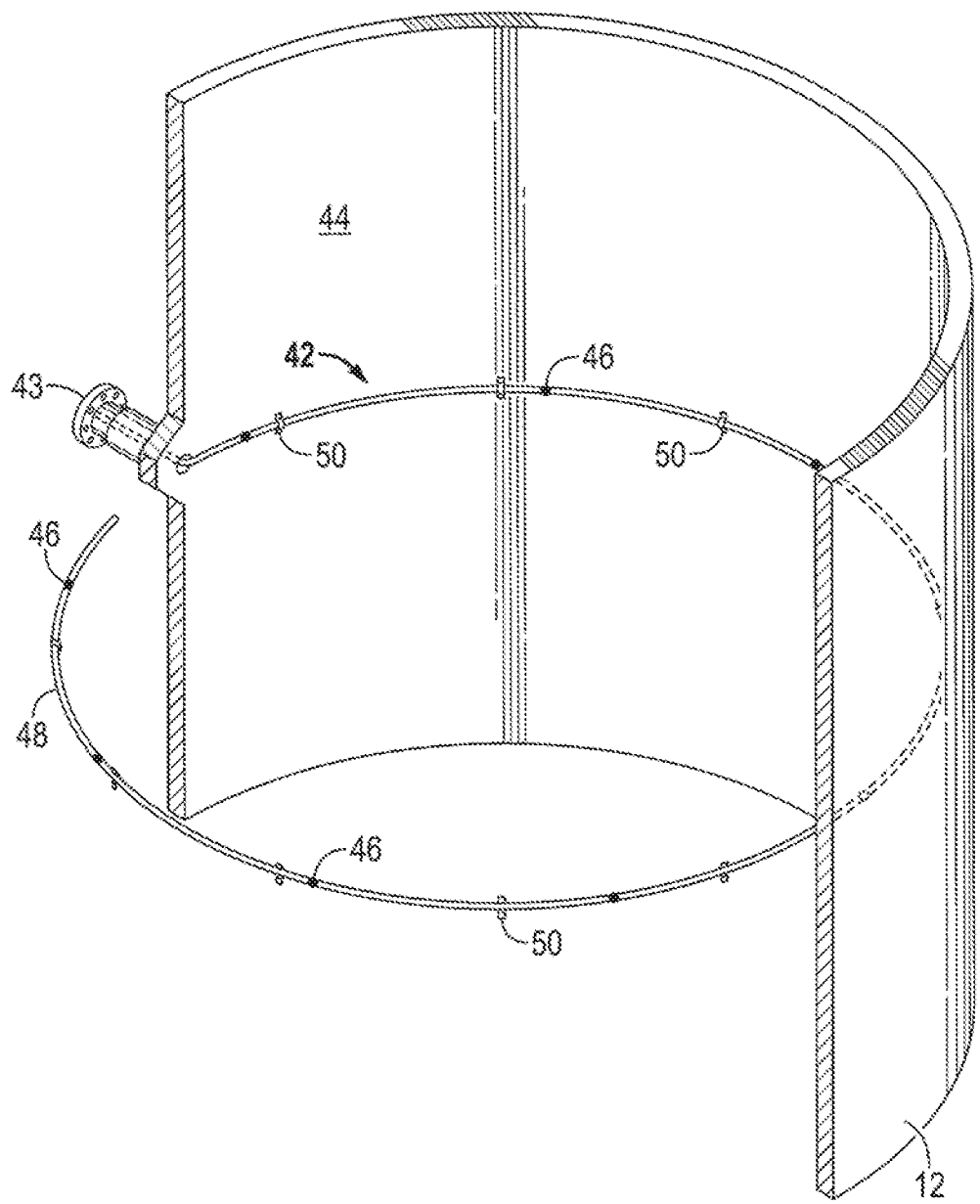
FIG. 2 is a partial cross section of the wall of a high temperature vessel depicting a temperature sensing assembly arranged to monitor temperature along a radial profile of the inner wall, according to an embodiment.

Turning now to FIG. 2, a cut away view of the vessel 12 is illustrated that shows an exemplary temperature sensing device 42 arranged to provide a radial temperature profile of the inner wall 44 of the vessel 12. In FIG. 2, the temperature sensing device 42 includes a plurality of temperature sensing points 46 disposed within a grounded or ungrounded protective sheath 48. FIG. 2 further illustrates that the device 42 is fed into the interior of the vessel 12 though a nozzle 43 and is supported on the inner wall 44 of the vessel 12 by a plurality of attachment devices 50. In the embodiment shown, the attachment devices 50 are generally u-shaped clips that are fastened to the inner wall 44, such as by tack welds, so that the sensing points 46 are maintained adjacent or in close proximity to the wall 44.

In other embodiments, such as shown in FIG. 20, attachment devices 50 may be configured as mounting pads, such as mounting pad 160, that can be attached (e.g., welded) to the inner wall 44 of the vessel 12. The sheath 48 can then be mounted on the mounting pad 160 and secured in place with a cover 162. The cover 162 can be attached to the pad 160, such as by welding or by attachment devices (e.g., screws). Alternatively, the cover 162 and pad 160 can be configured so that the cover 162 slides over the pad 160 to maintain the sheath 48 in position.

Figure 3:
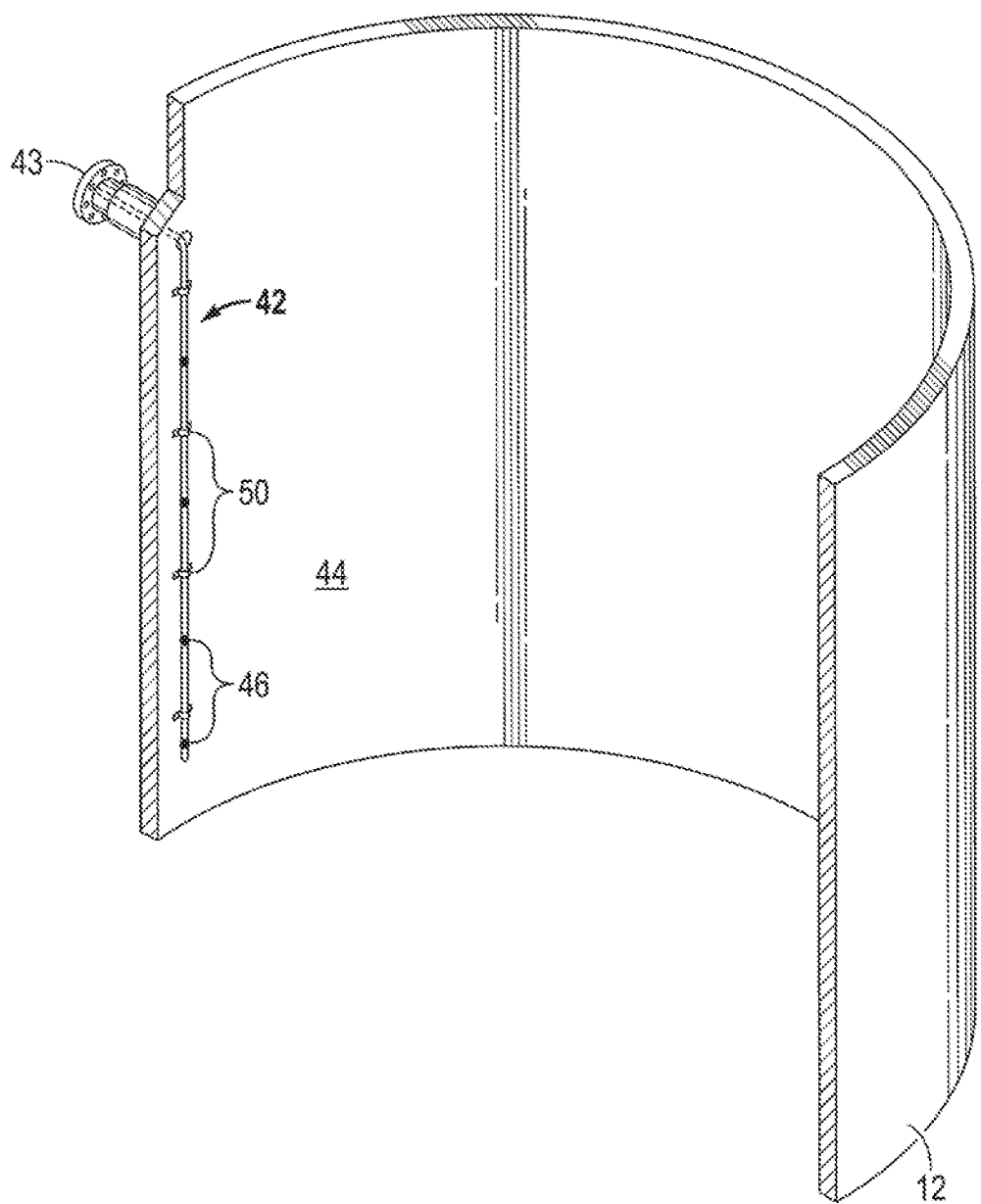
FIG. 3 is a partial cross section of the wall of a high temperature vessel depicting a temperature sensing assembly arranged to monitor temperature along a vertical profile of the inner wall, according to an embodiment.

FIG. 3 shows an alternative arrangement, where the temperature sensing device 42 is arranged to provide a vertical profile of the temperature of the inner wall 44 of the vessel 12. Again, the device 42 is fed into the interior of the vessel 12 through the nozzle 43 and is supported on the inner wall 44 of the vessel 12 by a plurality of attachment devices 50.

Figure 4:
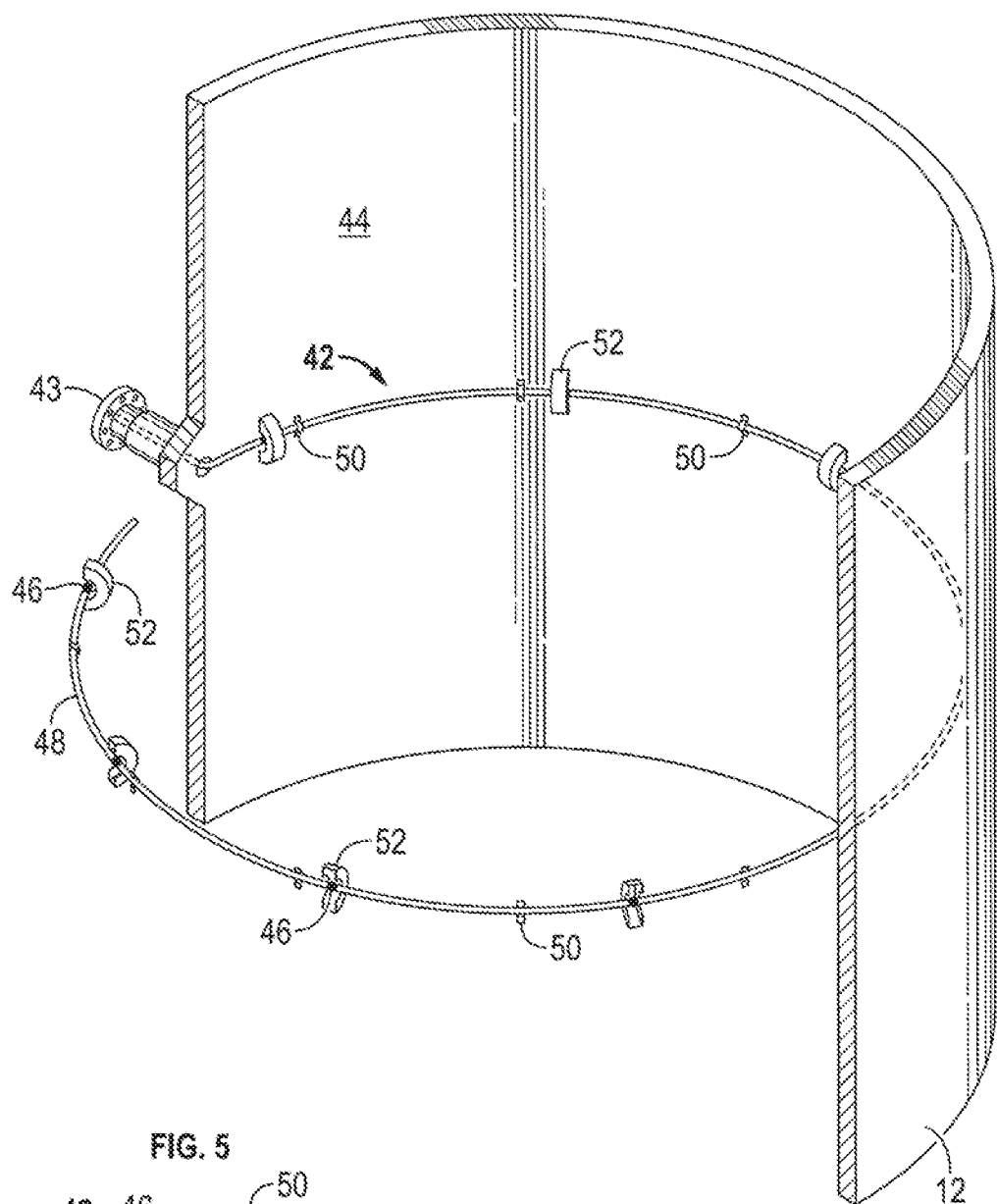
FIG. 4 is a high temperature vessel depicting a temperature sensing assembly arranged to monitor temperature along a radial profile of the inner wall where the sensing points are shielded with heat shields, according to an embodiment.
Figure 5:
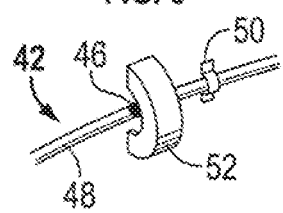
FIG. 5 is a detail illustration of a heat shield employed in the arrangement of FIG. 4, according to an embodiment.

FIG. 4 illustrates a further arrangement where each of the sensing points 46 is shielded from the heat generated by the process occurring within the high temperature vessel by a heat shield 52. A close-up view of an exemplary heat shield 52 is illustrated in FIG. 5. The shield 52 is generally u-shaped to fit around the sheath 48 of the device 42 and can be attached to the surface of the inner wall 44 with attachment devices (e.g., screws) or tack welds. The shield 52 can be a solid piece or may have an open interior space (e.g., see heat shields 140 shown in FIGS. 16 and 17). In some embodiments, the interior space can be filled with an insulative material (e.g., KAOWOOL or INSULFRAX) to further insulate the sensing point 46 from the heat of the process occurring in the vessel 12. In some embodiments, the interior space 54 is filled with insulative material before assembly in the vessel 12. In other embodiments, the heat shield 52 can be fixed in position over the sensing point 46 in the vessel 12 and the insulative material can then be injected into the interior space 54, such as via a slot or opening through the surface of the heat shield 52, 140 or via an opening or gap at an edge of the heat shield 52, 140 that provides access to the interior space. In this manner, the insulative material can completely cover the sensing point 46 with no gaps that would expose the sensing point 46 to heat from thermal sources other than the inner wall 44 of the vessel 12.

The temperature sensing device 42 can be supported on the inner wall 44 of the vessel 12 in a variety of manners, such as with attachment devices 50. In some embodiments, attachment devices 50 can be adjustable or resilient to position or bias the device 42 against or in close proximity to the wall 44 to ensure that the separation between the sensing points 46 and the wall 44 is minimized.

Figure 6:
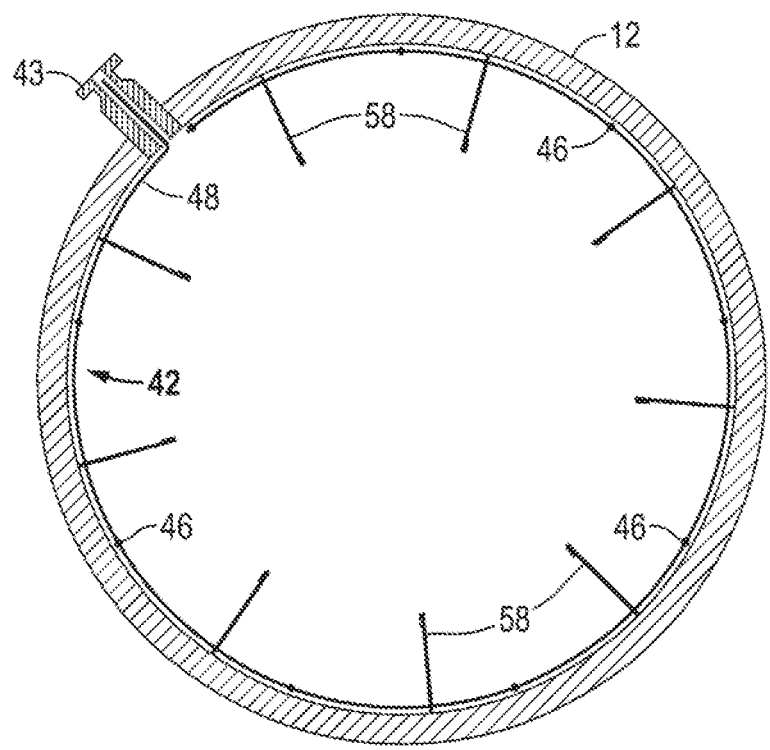
FIG. 6 is a cross section of a vessel that includes a temperature sensing assembly arranged to monitor temperature along a radial profile of the inner wall, depicting sport structures for supporting the temperature sensing assembly, according to an embodiment.
Figure 7:
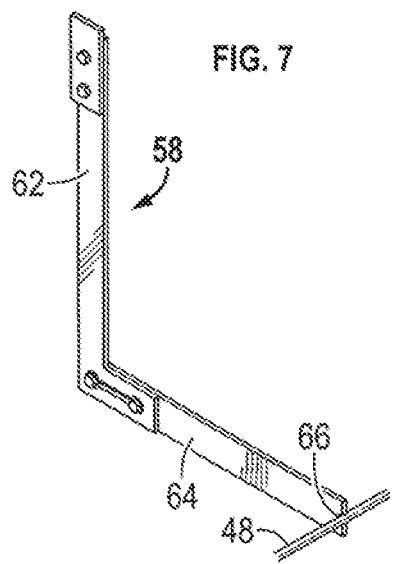
FIG. 7 is an exemplary support structure for supporting a temperature sensing assembly that can be implemented in the arrangement of FIG. 6, according to an embodiment.
Figure 8:
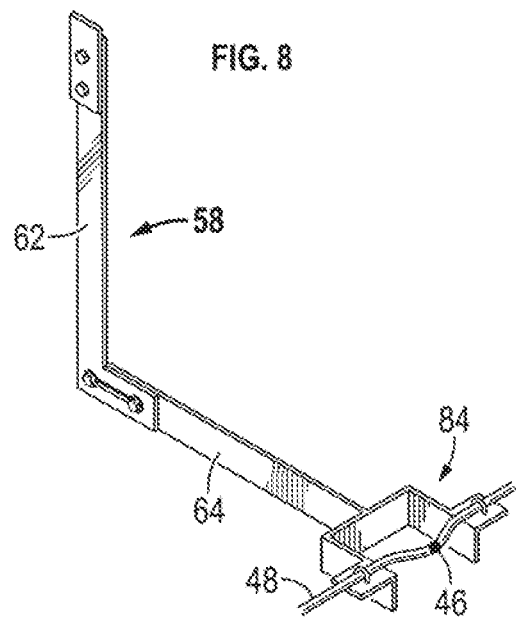
FIG. 8 is another exemplary support structure for supporting a temperature sensing assembly that can be implemented in the arrangement of FIG. 6, according to an embodiment.

For example, FIG. 6 shows a cross-sectional view of the vessel 12 in which temperature sensing device 42 is disposed radially about the inner wall 44. A plurality of adjustable supports 58 are arranged to push the sheath 48 against or towards the wall 44. The supports 58 can be configured as hangers that hang from supporting beams or brackets within the vessel 12. Exemplary adjustable supports 58 are shown in FIGS. 7 and 8. In FIG. 7 the L-shaped support 58 includes a vertical arm 62 and a horizontal arm 64 that are adjustable in the vertical and horizontal directions, respectively. A distal end of the horizontal arm 64 includes a notch 66 shaped to fit about the sheath 48. When assembled and adjusted, the arm 64 pushes against the sheath 48 to maintain the sheath 48 in contact with or in close proximity to the surface of the wall 64.

FIG. 8 illustrates an alternative arrangement where the adjustable support structure 58 is configured to bias the sheath 48 against the inner wall 44 at locations that correspond to the sensing points 46. In this embodiment, a distal end of the horizontal arm 64 of the support structure 58 includes a fork-shaped bracket 84 that supports the sheath 48 on either side of a sensing point 46. The portion of the sheath 48 between the arms of the fork-shaped bracket 84 can be beat to bring it into contact with the wall 44 when installed in the vessel 12. The arrangement shown in FIG. 8 can assist with further ensuring that the sensing points 46 are positioned in close proximity to the inner wall 44.

In yet other embodiments, and as shown in FIG. 9, the vessel 12 may include beams 88 or other structures to which supports 90 for the temperature sensing device 42 can be attached. FIGS. 10 and 11 illustrate exemplary supports 90 that can be attached to a beam 88. In FIG. 10, the support 90 provides a platform to which the sheath 48 is attached. FIG. 11 illustrates an alternative arrangement where a support arm 90 is screwed into a coupling 96 attached to the beam 88. The length of the arm 90 can be adjusted depending on the extent to which the arm 90 is threaded into the coupling 96. The distal end of the arm 90 includes a notch 98 shaped to hold the sheath 48. In this manner, the sheath 48 can be pressed towards and/or into contact with the inner wall 44. Other adjustable arrangements also are envisioned where the length of the support anus can be adjusted so as to provide a biasing force that pushes the sheath 48 towards and/or into contact with the inner wall 44. Such adjustable arrangements can include the use of slots, bolts, threads, or spring loaded couplings, as examples.

Examples of such arrangements are shown in FIGS. 12-14. In FIG. 12, the length of the arm 64 can be adjusted through the use of threaded fasteners 104 and 105 that vary the size of a gap 108 between a fork-shaped bracket 110 and the distal end of the arm 64. The ends of the bracket 110 include notches 112 and 114 that are arranged to receive the sheath 48. During installation, the gap 108 can be adjusted so that at least portions of the sheath 48, such as the portion of the sheath 48 that corresponds to the sensing point 46, contact or are in close proximity to the inner wall 44 of the vessel 12. In FIG. 13, the tenth an arm 116 is adjusted through the use of a spring-loaded union 118. In FIG. 14, a biasing force provides by an arm 120 is adjusted via the use of spring loaded pistons 122 and 124. Ends of the pistons 122 and 124 are coupled to support brackets 126 and 128 for holding the sheath 48.

Any of these support arrangements can be used with individual heat shields that shield each or the sensing points 46 from the heat of the process occurring inside the vessel 12 or from any other thermal source other than the wall 44. Examples of such arrangements are illustrated in FIGS. 15-17. In FIG. 15, arms 130 and 132 of a hanger are connected via a slotted threaded coupling 136. Heat shield 140 is attached to arm 132 for positioning over a sensing point 46. The heat shield 140 can be removably attached, such as via a resilient clip (not shown). As shown in FIG. 16, an arm 142 can include a spring-loaded coupling 138 to bias the sheath 48 and heat shield 140 into close proximity to the inner wall 44 of the vessel 12. In FIG. 17, the arm 142 and heat shield 140 assembly is coupled to support beam 88 via a threaded coupler 144. In the embodiment shown, the arm 142 and heat shield 140 assembly is configured to exert a biasing force via the spring loaded coupler 138 so as to urge the sensing point 46 of the thermocouple device 42 into close proximity to the wall 44 of the vessel 12.

When a heat shield 140 is employed, the heat shield can be filled with an insulative material (e.g., KAOWOOL™ or INSULFRAX® as examples) to further thermally isolate the sensing point 46 from heat from other sources. The insulative material can be present in the interior space of the heat shield 140 prior to installation in a vessel 12. In other embodiments, the temperature sensing device 42 and support and heat shield assemblies may first be installed in a vessel 12 and the insulative material can then be injected him the interior space of the boat shield 140. In some embodiments, the heat shield 140 can be removably attached to the support arm or to the sheath 48, such as via a resilient clip.

The temperature sensing device 42 can be used in conjunction with other multipoint and/or single point temperature sensing devices that are arranged to monitor temperature at locations other than the inner wall 44 of the vessel 12. For example, as shown in FIG. 18, the vessel 12 includes a multipoint sensing device 42 to monitor the temperature at multiple points along the inner wall 44, a sensing device 150 to monitor temperature of the process occurring with the vessel 12 (such as within a catalyst bed) and one or more single point sensing devices 152 to monitor the temperature on the outer wall 154 of the vessel 12. In the embodiment shown, the inner wall sensing device 42 and the catalyst bed sensing device 150 are fed through the nozzle 43 into the interspace of the vessel 12 and then positioned and supported in there by appropriate hanger and/or support arrangements, such as any of the arrangements illustrated in the figures described herein.

As discussed, in certain implementations, the thermocouple device 42 can have multiple sensing points 46 disposed at unique locations along the length of the sheath 48. An example of multiple sensing points 46 contained within the sheath 48 of device 42 is shown schematically in the cross-section view of FIG. 19. In this implementation, the sheath 48 comprises an open interior into which four conductor pairs 2A, 2B, 2C and 2D, extend. Although four conductor pairs 2 are shown, fewer or more conductor pairs may be included within the sheath 48. An insulation material 3, such as an electrical insulation material, is disposed about the individual conductors of the conductor pairs 2A-D. The insulation material 3 generally fills the interior about the conductor pairs 2A-D. Although various electrical insulation materials may be used, an exemplary material comprises magnesium oxide (MgO).

With reference to FIG. 19, temperature can be determined at a plurality of locations along the length of the sheath 48 by forming junction points 46A, 46B, 46C, 46D at selected locations along the sheath 48. By way of example, the embodiment of FIG. 19 illustrates four conductor pairs 2A-D each having its own unique junction point 46A-D, respectively. The junction points 46A-D are formed at unique longitudinal locations along the sheath 48 to permit the sensing of temperature at those unique locations.

Each conductor pair 2A-D comprises a first conductor 4 (i.e., 4A, 4B, 4C or 4D) illustrated in solid line and a second conductor 5 (i.e., 5A, 5B, 5C or 5D) illustrated in dashed line in FIG. 19. The first conductor 4 and the second conductor 5 of each conductor pair 2 are made of dissimilar conductive materials, such as iron/constantan, chromel/alumel, copper/constantan, chromel/constantan, etc. Various combinations of different conductor pair types can be utilized within a single sheath or the conductor pairs may all be of the same type. A variety of materials also may be used to form the sheath 48, such as stainless steel and Inconel, as may be appropriate for the particular application in which the thermocouple device 42 is employed.

Although a variety of techniques may be used to join the dissimilar conductors 4A-D/5A-D at desired junction points 46A-D within the sheath 48, one technique is to provide conductor pairs 2A-D by forming a plurality of rods 6A-H that extend into the sheath 48 to distal end 7. The rods 6A-H are preformed of the material of first conductor 4A-D, second conductor 5A-D, or a combination of the two conductors. When the rods 6A-H are placed within the sheath 48, the junction points 46A-D are disposed at desired locations for sensing temperature.

Each of the rods 6A-H has a distal rod end 8, and the appropriate pairs of rod ends 8 are joined together to form conductor pairs 2A-D. Although distal rod ends 8 may be joined in a variety of manners, the distal rod ends 8 may be fused, e.g., welded, together at a fusion end 66. Alternatively, a cross piece or cross rod may be utilized. For example, a cross piece formed of the appropriate conductor material may be welded or otherwise joined to corresponding rod ends. As shown in FIG. 19, the rods 6A-H of a conductor pair 2A-D remain spaced apart from one another along the entire length of the sheath 48 until they are joined at their respective distal ends 8 at the distal end 7 of the sheath 48.

Although various processes may be used to form the thermocouple device 42, one exemplary methodology comprises preparing the rods 6 having dissimilar materials by, for example, welding the dissimilar conducting materials together at a predetermined point 46. The combination rods 6 along with the remaining rods 6 are then passed through the insulation 3 within the open ended sheath 48. The insulation 3 may initially be placed within the sheath 48 in the form of beads. The sheath 48 is then swaged to compact the insulation 3 and the sheath 48.

Following swaging, the insulation 3 is removed at the distal end 7 and the appropriate rods 6 are coupled to form conductor pairs 2. For example, cross pieces 8 may be welded across appropriate rod distal ends. An appropriate insulation material 3, such as magnesium oxide powder, is placed around the protruding rod ends and a sheath cap can be attached to the remainder of the sheath 48 by, for example, welding.

In other embodiments, the conductor pairs can comprise two wires made of dissimilar materials and the junction points may be formed by welding the wires at a desired location alone their length.

Regardless of the manner in which the conductor pairs and junction points are formed, in various implementations, the sheath 48 can be twisted to align each of the junction points 46 in a manner that aligns the points 46 with the profile of the inner wall 44 of the vessel 12. This twisting can be done either prior to or during the installation of the temperature sensing device 42 in the interior of the vessel. Alignment of the junction points 46 with the wall 44 and the support arrangements that maintain the junction points 46 in position ensure that the set of temperature data obtained from the device 42 is indicative of the actual temperature of the wall 44 of the vessel 12. Armed with a data set that accurately reflects the actual wall temperature, the operator of the vessel 12 can then make decisions that allows the process within the vessel to be performed at a higher temperature, thus increasing yield without compromising reliability.

Although the various embodiments above have been described in the context of measuring the temperature of the inner wall of a high temperature vessel used or processing hydrocarbons, it should be understood that embodiments can be implemented in any application where temperature measurements of the inner wall of a vessel or other structure is desired. It should further be understood that such embodiments fall within the scope of the appended claims.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A temperature sensing assembly for measuring temperature of a surface of a structure, comprising:
   a thermocouple assembly having a plurality of junction points arranged to measure the temperature of an inner wall of a high-temperature vessel at a corresponding plurality of desired locations; and
   a plurality of hangers to attach to a support structure supported within the high-temperature vessel and to hold the thermocouple assembly and position the plurality of junction points adjacent the inner wall of the high-temperature vessel at the corresponding plurality of desired locations, each of the plurality of hangers including an adjustable member,
   wherein adjustment of the adjustable member of the plurality of adjustable hangers applies a force on the thermocouple assembly in a radial direction of the high-temperature vessel that biases the plurality of junction points towards the inner wall, and wherein the force in the radial direction is maintained so that the plurality of junction points are held adjacent the inner wall at the corresponding plurality of desired locations.

2. The assembly as recited in claim 1, wherein the plurality of junction points are disposed within a single elongate sheath, and wherein the plurality of junction points are aligned within the elongate sheath to align the plurality of junction points with a profile of the inner wall.

3. The assembly as recited in claim 2, wherein the profile of the inner wall is a horizontal profile in the vessel.

4. The assembly as recited in claim 2, wherein the profile of the inner wall is a vertical profile in the vessel.

5. The assembly as recited in claim 2, wherein the adjustable members are spring-loaded.

6. The assembly as recited in claim 1, further comprising a plurality of heat shields, each heat shield positioned to thermally shield one of the plurality of junction points from heat from thermal sources other than the inner wall of the vessel.

7. The assembly as recited in claim 6, wherein each of the plurality of heat shields is coupled to a corresponding one of the plurality of hangers.

8. The assembly as recited in claim 7, wherein each of the plurality of heat shields includes an interior portion filled with an insulative material.

9. The assembly as recited in claim 6, wherein the heat shield includes an interior portion filled with a thermally insulative material, and wherein the heat shield is configured so that the interior portion is filled with the thermally insulative material after the heat shield is positioned over the corresponding junction point.

10. The assembly a recited in claim 1, wherein the adjustable members are spring-loaded.

11. An assembly, comprising:
    a high temperature vessel in which a high temperature process is performed;
    a multipoint thermocouple comprising a plurality of conductor pairs disposed within an elongate sheath, each conductor pair having two conductors of dissimilar materials joined at a junction point, each junction point being disposed at a unique longitudinal location within the sheath so that temperature can be sensed at a plurality of locations along an inner wall of the high temperature vessel;
    a plurality of heat shields, each of the plurality of heat shields positioned over a corresponding junction point to shield the corresponding junction point from thermal sources other than the inner wall of the vessel, wherein the heat shields each include an interior portion;
    thermally insulative material that is disposed within the interior portion of each heat shield after the heat shield is positioned over the corresponding junction point; and
    a plurality of support structures coupled to the inner wall of the high temperature vessel to support the multipoint thermocouple and maintain the junction points proximate the inner wall,
    wherein each of the plurality of support structures includes an adjustment member to adjust the position of the support structure so that the support structure exerts a force that biases one of the plurality of heat shields and its corresponding junction point towards the inner wall of the vessel.

12. The assembly as recited in claim 11, wherein the adjustment mechanism is spring-loaded.

13. The assembly as recited in claim 11, wherein the plurality of junction points are aligned with a profile of the inner wall.

14. The assembly as recited in claim 13, wherein the profile is a horizontal profile of the high temperature vessel.

15. The assembly as recited in claim 13, wherein the profile is a vertical profile of the high temperature vessel.

* * * * *